(No Model.)
D. W. BROWN.
RESERVOIR OR TANK.
No. 370,372. Patented Sept. 27, 1887.
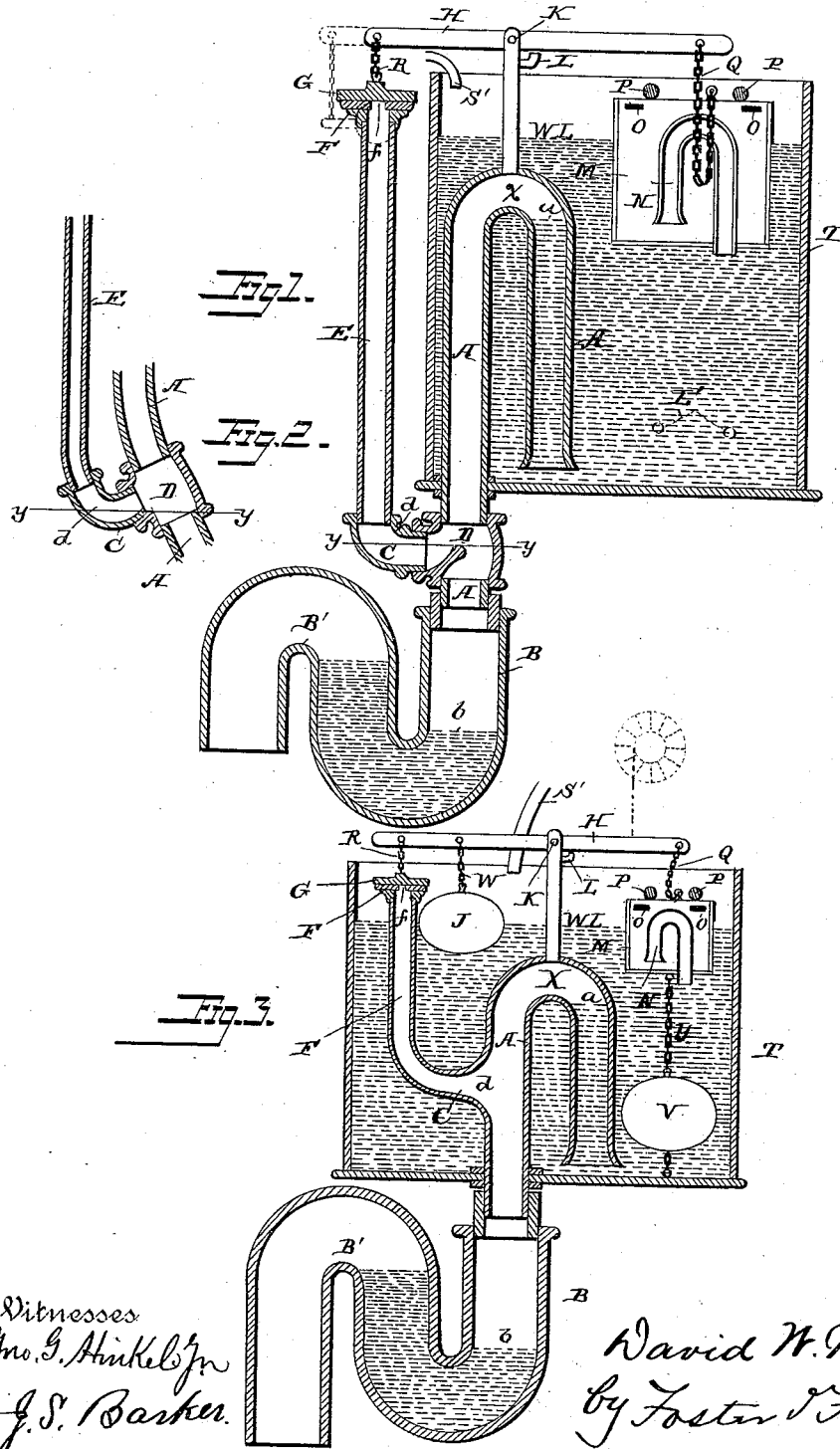

UNITED STATES PATENT OFFICE.

DAVID W. BROWN, OF NEW YORK, N. Y.

RESERVOIR OR TANK.

SPECIFICATION forming part of Letters Patent No. 370,372, dated September 27, 1887.

Application filed March 6, 1886. Serial No. 194,279. (No model.)

*To all whom it may concern:*

Be it known that I, DAVID W. BROWN, of New York city, in the State of New York, have invented an Improvement in Reservoirs or Tanks for the Collection, Intermittent Discharge, and Measurement of Liquids; and I do hereby declare that the following description, taken in connection with the drawings, hereinafter referred to, constitute a full and accurate description of the apparatus and of such parts as I claim and desire to secure by Letters Patent.

My invention relates to improvements in siphon reservoirs or tanks for the intermittent discharge of liquids for flushing or other purposes, and also for the measurement of the quantity of liquid so discharged from the reservoir; and the purposes of the improvement are to provide means whereby the regular automatic intermittent action of the siphon may be secured and any partial or imperfect action be prevented, and also to provide a moving part or parts, which may be connected with suitable recording and registering mechanism, so as to measure and record the quantity of liquid discharged from the reservoir.

Referring to the drawings to aid in describing the construction and operation of the apparatus, Figure 1 represents a vertical section of one form of the apparatus. Fig. 2 represents an alternative form of the lateral branch C, also in vertical section. Fig. 3 represents an alternative form of the entire apparatus, also in vertical section.

Similar letters refer to corresponding parts throughout the several views.

T, Figs. 1 and 3, is a reservoir or tank for the reception of liquids, with which is connected the siphon A, having its crown below the top of the reservoir T, and its shorter limb reaching nearly to the bottom of the said reservoir or tank T.

The siphon may be connected with the reservoir in any suitable manner, and its longer limb may pass through the bottom of the said reservoir or tank T, or through the sides of said reservoir, so as to terminate and discharge outside of the reservoir or tank T.

Through one side of the longer limb of siphon A is an opening, $d$, to which is connected a lateral branch, C, preferably below the level to which it is desired to draw the liquid in the reservoir or tank T, as shown in Fig. 1, and I prefer to connect the said lateral branch below the bottom of the reservoir T, as shown in said Fig. 1. The longer limb of the siphon A is continued a short distance below the lateral branch C, (or below the bottom of the reservoir T, if the branch C is placed above the bottom of the reservoir,) and it is connected with a trap, B. This trap B preferably has a depth of seal greater than the distance between the lower side of the bend X of the siphon A and the level W L above said bend, the level W L being that at which the liquid stands in the reservoir T at the time when the siphon A begins to discharge.

The purpose of the trap B is to prevent the flow of air from the siphon A, and it may be any known form of trap for retaining a liquid seal, or any other known and suitable means for the purpose. The diameter of the pipe forming the trap B is preferably greater than the diameter of the longer limb of the siphon A.

The lateral branch C (which in Fig. 1 is shown similar to a "division" T) connects the siphon A with an air-pipe, E, and at the lower side of the opening $d$ is preferably a lip, D, projecting upward into the main channel of the siphon A, as shown in Fig. 1. This lip D extends not quite up to the level of the top of the clear opening $d\ d$ of the lateral branch C. This relation of the height of the lip D to the clear opening $d\ d$ is indicated in Fig. 1 by the horizontal dotted line $y\ y$. The lateral branch C is placed at such a height with respect to the trap B that the clear opening $d\ d$ is above the outgo or bend of the trap B. The air-pipe E is connected at its lower end with the lateral branch C, and extends up to or above the level W L. The said air-pipe E has at its upper extremity a valve, G, preferably in the form shown in Fig. 1—namely, with a valve-seat, F, in which is an aperture, $f$—and said valve G is preferably suspended from an arm of a lever, H, supported on a standard, S.

The standard may be firmly attached to the siphon A, as shown in the drawings, or may be attached to the tank in any suitable manner. The lever moves freely on a fulcrum, K, and the motion of the lever in the direction of opening the valve G may be restricted by a stop, L, or in any other suitable manner.

In place of the valve G may be used a cock operated by the aforesaid lever H, as shown in dotted lines, Fig. 1. The weight of the valve G (or when a cock is used the weight of the end of the lever H operating the same) must be sufficient to cause the valve G to close upon the valve-seat F when the lever is not acted upon by the weight of the cup M, as hereinafter set forth, and also sufficient to resist the effort of the air-pressure within the air-pipe E to open the said valve G. From the other arm of the lever H is suspended by a chain, Q, a vessel or cup, M, containing a siphon, N, having its shorter limb reaching nearly to the bottom of the said cup or vessel M and its longer limb terminating below the bottom of said cup or vessel M. The crown of the siphon N is somewhat below the top of the cup M. The cup M is of such weight, specific gravity, and displacement that when filled with liquid and immersed in liquid in the reservoir T, it will sink and have weight sufficient to move the lever H and open the valve G, and the weight and displacement of the cup M are such that it will float when empty. The siphon N is of such a height that when the cup M is empty the lower side of the bend of the siphon N will be above the line of flotation of the empty cup M. In other words, when the empty cup M floats freely in liquid in the reservoir the lower side of the bend of the siphon N will be above the level of the liquid in which the cup floats, so that no liquid can enter the cup M through the siphon N.

In the upper part of the cup M, above the bend of the siphon N, are preferably openings O O, of small area as compared with the size of the cup M. These openings are not essential to the operation of the cup M, but aid in its efficiency, as hereinafter described. The cup M may be covered and have openings in the cover for the admission of air and liquid, or the top of the cup may be open. The cup may be of any convenient shape. The cup M is suspended from the lever H by a chain, Q, as aforesaid, of such length that when the cup has fallen to the lowest point to which the length of the chain Q will allow it to fall, when the lever is drawn down to the stop L, the lower end of the longer limb of the siphon N in the cup M will be above the lower end of the shorter limb of the siphon A. In place of the stop L, projections or supports L' may be placed in the tank T, to support the cup M when it has fallen to its lowest position, as above described.

P P are projections or stops to restrict the height to which the cup M can rise in the reservoir T.

In place of the stops P P, as shown in Figs. 1 and 3, a chain or chains may connect the cup M with the bottom of the reservoir T, as shown in Fig. 3, and the height to which the cup M can rise will then be regulated by the length of said chain or chains.

The rise of the cup M can be restricted by any other known suitable means. The height to which the cup M can rise by reason of the stops P P, or equivalents, is such that when the cup is at its highest position the bend of the siphon N will be above the crown of siphon A and a little below the level W L.

S' is a supply pipe or channel, through which liquid is admitted to the reservoir or tank T.

Fig. 2 shows the construction of an alternative form of the lateral branch C, in which said branch is made in the form of a Y-branch or oblique connection, the lateral oblique passage or opening $d\ d$ projecting downward and outward with respect to the main channel of the siphon A; and I prefer to so bend the longer limb of the siphon A that the opening of the lateral branch will be on its under side. The point D at the junction of the lateral branch with the main channel of the siphon A is not quite up to the top of the clear opening $d\ d$ of the lateral branch. This relation of the several parts is clearly shown in Fig. 2 by the horizontal dotted line $y\ y$.

The operation of the apparatus is as follows: First, assuming the trap B to be empty, the reservoir T and the cup M being both also empty, said cup is at the lowest point to which the chain Q will allow it to fall, and the lever H is in such position that the valve G and air-pipe E are open. Liquid flowing into the tank T through the supply-pipe S' rises in the said tank and in the shorter limb of siphon A, and floats the empty cup M, which accordingly rises in the reservoir T with the rise of the liquid. This rise of the cup M soon allows the valve G to close by gravity, thus preventing the escape of air from the air-pipe E. From this point the cup M continues to rise, the chain Q being slackened. When liquid in the reservoir reaches the bend X of the siphon A, it begins to flow over the said bend into the longer limb of the siphon A and into the trap B, which it quickly seals against the escape of air from the siphon A. A small quantity of liquid thereafter running over the bend X of the siphon A raises the level of the liquid in the trap B, thereby compressing the air in the siphon A between the liquid in the trap B and in the shorter limb of siphon A, and depressing slightly the liquid in the shorter limb of siphon A to a level, as $a$, below the bend X of said siphon, so that no more liquid can run over the bend X of said siphon A until the liquid in the reservoir rises above said bend X to a height sufficient to force it over said bend; but no free discharge of the siphon can take place under such circumstances, on account of the pressure of the air; but by reason of the constant rise of liquid in the reservoir some liquid will be forced over the bend X into the trap B, raising the level of liquid in the said trap and continually increasing the pressure of the air confined between the seal of the trap and the shorter limb of siphon A. The liquid in the reservoir rises, as aforesaid, and the empty cup M will be borne up by it until it comes in contact with the stops P P. At this point liquid rises in the longer limb of siphon N, as it rises in the reservoir, until it begins to run over the bend of the siphon N into the cup M, decreasing the buoyancy of the cup until it is sufficiently depressed for the liquid to flow through the holes O O, or over the edge of the cup, causing it to sink.

In order to prevent the seal of the trap B being broken by the pressure of water in the reservoir above the bend of the siphon A, a considerable depth of seal should be given to the trap B, and the apparatus will operate even if this depth of seal is equal to the depth of the reservoir, provided that the bend B' of said trap is below the clear opening of the lateral branch C; but I have found by experiment that the depth of seal is sufficient to prevent a premature discharge of the siphon A if it is somewhat greater than the distance between the level of the lower side of bend X in siphon A and the lower side of the bend in siphon N when the cup M is at its highest point. Even without the openings O O the cup M will fill through the siphon N; but the openings O O shorten the time for such filling.

The cup M, sinking to the length of the chain Q, by its weight moves the lever H and opens the valve G until the motion of the lever H is checked by the stop L. This opening of the valve G allows the compressed air in the siphon A and air-pipe E to escape, and the pressure of air in the siphon A being thereby relieved, the excess of liquid-pressure in the reservoir or tank T, due to its height above the bend X of the siphon A, forces the liquid in the shorter limb over the bend X of the siphon A and quickly charges the longer limb, thereby setting siphon A into operation, and so emptying the reservoir. When siphon A is set and begins to operate, a part of the liquid, descending in the longer limb of the said siphon, is diverted by the projecting lip D of the lateral branch C, or by the obliquity of the said lateral branch C, as shown in Fig. 2, into the air-pipe E, thereby closing the lateral opening $d$ $d$ and the air-pipe E against the passage of air, although the valve G remains open throughout the discharge of the siphon A. The air-pipe E being thus closed by the diversion of liquid into it, air may not enter the siphon A, and thus said discharge is not interrupted by the entrance of air into the siphon A, and the said siphon will continue to operate until the liquid in the reservoir T is drawn down to the lower end of the shorter limb of the siphon A. When siphon A is at or near the end of its discharge, the liquid in the opening of the lateral branch C and in the air-pipe E runs back into the longer limb of siphon A over the projecting lip or point of junction D, and by reason of the height of the lip D (or the point D in Fig. 2) being less than the height of the clear opening $d$ $d$ liquid will continue to so run back into the longer limb of the siphon A until the lateral opening $d$ $d$ will be only partially filled with liquid, and a clear space for the passage of air from the air-pipe E into the longer limb of siphon A will be left above the liquid remaining in the lateral opening $d$ $d$. The admission of air through this clear opening to the longer limb of the siphon A at or shortly after it has finished its discharge allows the said siphon to clear itself of liquid and prevents its premature and partial action when the reservoir T is again filled. The liquid in the reservoir T being thus drawn below the lower extremity of the longer limb of the siphon N in the cup M, the said siphon N comes into free operation and empties the cup M, so that both the reservoir T and the cup M are now empty. Liquid continuing to enter reservoir T, it will quickly seal the mouth of the shorter limb of siphon A against the escape of air, the trap B being also sealed by liquid left in it from the previous discharge of the siphon. The valve G will be closed by the rise of the cup M in the reservoir T, as before, and air will be compressed in the siphon A, so that the reservoir will fill until the cup M comes into contact with the stops P P. The fall of the cup M will open the valve G and the siphon A will be set in operation and the reservoir will be again emptied. These operations of alternately filling and emptying the reservoir will go on continuously thereafter.

When the apparatus is to be used for the discharge of liquid containing solid matter—as, for example, unfiltered sewage—the form of the apparatus shown in Fig. 3 is preferably employed. The reservoir T has a siphon, A, with trap B, as aforesaid; but the air-pipe E is connected directly with the siphon A. The air-pipe E may be connected with the crown of siphon A or with the longer limb of said siphon above the trap B, as shown in Fig. 3, and it is preferably connected with the longer limb of siphon A in the latter way. The air-pipe E has at its upper extremity a valve, G, arranged as previously set forth in the description of Fig. 1. This valve is suspended by a chain, R, from a lever, H, and from the same end of lever H is also suspended by a chain, W, a float, J, of the ordinary construction of floats, so that its weight tends to close the valve G. From the other end of lever H is suspended by a chain, Q, the cup M, containing a siphon, N, of the construction already described in Fig. 1. The relation of the weights of the float J and cup M is as follows: The float J is of such weight that when it is not borne up and supported by liquid in reservoir T it will have weight sufficient to move lever H and allow valve G to close against the contrary weight of cup M even when said cup is filled with liquid and suspended in the air. The weight of the cup M is such that when it is filled with liquid and immersed in liquid in reservoir T it will sink and have weight sufficient to move lever H and open valve G, provided the float J is then borne up by liquid in the reservoir T and is not exerting its weight on the lever H.

The length of chain W, by which float J is suspended from lever H, is such that when liquid is discharging from reservoir T the float J, falling with the fall of the liquid, will descend to the length of the chain W and close valve G before the liquid in reservoir T has fallen to the level of the crown of siphon A. The length of chain Q, by which cup M is suspended from lever H, is preferably such that when said lever is in a position to just allow valve G to close the line of flotation of the cup M will be a little below the level or at the same level as the line of flotation of the float J. From the same arm of lever H from which cup M is suspended there is also suspended a float, V, of the ordinary construction of floats, so arranged that its weight tends to open the valve G when the float V is not supported by liquid. This float V may be suspended from lever H by a separate chain, or it may be connected with bottom of cup M by a chain, Y, as shown in Fig. 3. The length of the chain or chains by which float V is suspended from lever H is such that when the siphon A has emptied the reservoir T the float V will have fallen to the full length of the chain or chains and will have opened valve G. The weight of float V is such that when it is not supported by liquid in the reservoir T it will have weight sufficient to open valve G, even against the contrary weight of float J, even when said float J is not supported by liquid in reservoir T.

The height to which the float V can rise in reservoir T may be restricted by the chain Z, or in any other suitable manner. The height to which cup M can rise in reservoir T is regulated by stops P or chains Y and Z or their equivalent.

The operation of the whole is as follows: Assuming the trap B to be empty, the reservoir T and the cup M being both empty, the float V is at its lowest point and the valve G is open. Liquid flowing into the reservoir T through supply-pipe S' quickly rises sufficiently to seal the lower end of the shorter limb of siphon A, and liquid still continuing to rise in reservoir T soon thereafter floats the float V and allows the valve G to close, thereby preventing the escape of air from the air-pipe E and siphon A. Liquid still continuing to rise in reservoir T reaches the level of the bend X of siphon A, and runs over said bend into trap B, sealing the trap against the escape of air from siphon A. By the rise of liquid in the reservoir the air in siphon A is compressed, and no free discharge can take place, and the difference of level between the liquid in the shorter limb of siphon A and in the reservoir steadily increases. Liquid in reservoir T continuing to rise at length bears up cup M and float J, so that their chains Q and W, respectively, are slackened and the cup M comes in contact with the stops P and can rise no farther. At this point liquid rises into the longer limb of the siphon N and flows over the bend into the cup M, so that its buoyancy is decreased, and the liquid continuing to rise in reservoir T, flows through the openings O O, thereby filling cup M and causing it to sink. Cup M sinking moves lever H and opens valve G, the float J being at this time borne up by liquid in reservoir T and exerting no pull on lever H. This movement of valve G permits the compressed air in siphon A and air-pipe E to escape, and liquid rushing over the bend X of siphon A into the longer limb of said siphon charges it. Siphon A thus coming into operation begins to empty the reservoir T, and the float J falling with fall of liquid in said reservoir T closes the valve G upon the valve seat F before liquid in reservoir T has fallen to the level of the crown of siphon A, thereby preventing the entrance of air into said siphon. Siphon A consequently continues to empty reservoir T, and when reservoir T is nearly empty the float V falling moves lever H and opens valve G, admitting air to siphon A, which stops its discharge, and also allows the siphon to clear itself of liquid, thereby preventing premature and partial action of the siphon A when the reservoir is again filled. When the discharge of siphon A is ended, sufficient liquid remains in trap B to seal it against the escape of air from siphon A, and liquid continuing to enter reservoir T the said reservoir is again filled and discharged, and so on continuously.

When it is desirable to register the amount of liquid received and discharged, the reciprocation of the lever H may be utilized in an obvious manner to operate any of the known registering devices that may be suitable.

It is evident that other means of filling and emptying the float than those shown may be used, since the purpose of the cup M is attained when it is so constructed that it will fill with liquid when the tank T is filled above the top of the bend of the siphon A, and empty itself when the tank has been emptied by the siphon A.

What I claim, and desire to secure by Letters Patent, is—

1. The combination of a reservoir or tank, a siphon therein, an automatic seal to the siphon, an air-pipe communicating with the said siphon, a valve on the said air-pipe, an automatically-filling cup or float in the reservoir, provided with a siphon for automatically emptying it, a stop to limit the upward movement of the float, and flexible connections between said cup and valve, substantially as and for the purpose specified.

2. The combination, with the reservoir T and siphon A, of the air-pipe E, having the automatically-operated valve and the lateral branch C, connected to the siphon, and having aperture $d\ d$, and lip D, substantially as described.

3. The combination, with the reservoir T and siphon A, of the air-pipe E, having the lateral branch C, connected to the siphon and extending partially below the line of juncture with the same, substantially as and for the purpose set forth.

4. In combination, the reservoir T, cup M, with siphon N, stops P P, chain Q, lever H, valve G, air-pipe E, siphon A, and trap B, arranged to operate substantially as described.

5. A tank provided with a siphon-outlet, an automatically-operated air-inlet to the siphon, and an automatically-sealed outlet to the siphon, an automatically filling and emptying float, a stop which limits the upward movement of the float, and flexible connections between the float and air-pipe, substantially as and for the purpose specified.

In testimony whereof I affix my signature in presence of two witnesses, this 5th day of March, 1886.

DAVID W. BROWN.

Witnesses:
C. WYLLYS BETTS,
DANIEL E. DELAVAN.